(12) United States Patent
Shibahara et al.

(10) Patent No.: US 11,411,761 B2
(45) Date of Patent: Aug. 9, 2022

(54) DETECTION DEVICE, DETECTION METHOD, AND PROGRAM

(71) Applicant: NIPPON TELEGRAPH AND TELEPHONE CORPORATION, Chiyoda-ku (JP)

(72) Inventors: Toshiki Shibahara, Musashino (JP); Takuma Koyama, Musashino (JP); Yasushi Okano, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 83 days.

(21) Appl. No.: 16/962,100

(22) PCT Filed: Dec. 21, 2018

(86) PCT No.: PCT/JP2018/047278
§ 371 (c)(1),
(2) Date: Jul. 14, 2020

(87) PCT Pub. No.: WO2019/142602
PCT Pub. Date: Jul. 25, 2019

(65) Prior Publication Data
US 2020/0344083 A1    Oct. 29, 2020

(30) Foreign Application Priority Data
Jan. 17, 2018   (JP) .............................. JP2018-005770

(51) Int. Cl.
*H04L 12/28* (2006.01)
*B60R 16/023* (2006.01)
(Continued)

(52) U.S. Cl.
CPC ............ *H04L 12/28* (2013.01); *B60R 16/023* (2013.01); *H04L 5/0044* (2013.01);
(Continued)

(58) Field of Classification Search
CPC . B60R 16/0231; B60R 16/0232; G01C 21/00; G07C 5/008; B60W 10/18;
(Continued)

(56) References Cited

U.S. PATENT DOCUMENTS

| 2015/0089236 A1* | 3/2015 | Han ...................... H04W 12/10 713/181 |
| 2016/0205194 A1* | 7/2016 | Kishikawa .............. H04L 63/10 726/1 |
| 2018/0144119 A1 | 5/2018 | Kishikawa et al. |

FOREIGN PATENT DOCUMENTS

JP    2017-50841 A    3/2017

OTHER PUBLICATIONS

Otsuka, S. et al., "Intrusion Detection for In-vehicle Networks without Modifying Legacy ECUs," IPSJ SIG Technical Report, vol. 2013-EMB-28, No. 6, 2013, pp. 31-35 (identified as pp. 1-5).
(Continued)

*Primary Examiner* — Marsha D Banks Harold
*Assistant Examiner* — Dharmesh J Patel
(74) *Attorney, Agent, or Firm* — Oblon, McClelland, Maier & Neustadt, L.L.P.

(57) ABSTRACT

A detection device includes: an object data extraction unit that extracts, from one or more pieces of communication data which are transmitted from one or more electronic control units, at least part of a payload contained in communication data that satisfies a predetermined condition, information by which the communication interval between the communication data can be calculated, and a serial number of the communication data as object data; a partial sequence creation unit that creates, using the extracted object data, a partial sequence containing information corresponding to at least part of a payload and information indicating a communication interval from two or more pieces of object data with the same serial number; and a
(Continued)

detection unit that detects, using the created partial sequence, predetermined communication data based on the order relation between at least part of a payload and the corresponding part of another payload and a communication interval. The predetermined condition is a condition for extracting only communication data which is transmitted periodically and also in conjunction with a predetermined event.

7 Claims, 21 Drawing Sheets

(51) Int. Cl.
    *H04L 5/00*        (2006.01)
    *H04L 9/40*        (2022.01)
    *H04N 21/835*     (2011.01)
    *H04L 12/40*      (2006.01)

(52) U.S. Cl.
    CPC ....... *H04L 63/1416* (2013.01); *H04N 21/835* (2013.01); *H04L 2012/40215* (2013.01); *H04L 2012/40273* (2013.01)

(58) Field of Classification Search
    CPC .. B60W 10/20; B60W 50/008; B60W 50/045; B60W 2050/0075; B60W 2050/008; B60W 2050/041; B60W 2556/65; H04L 5/14; H04L 67/10; H04L 67/12; H04W 4/40; H04W 4/80; H04W 72/04
    See application file for complete search history.

(56) References Cited

OTHER PUBLICATIONS

Narayanan, S.N., et al., "Using Data Analytics to Detect Anomalous States in Vehicles," Department of Computer Science & Electrical Engineering University of Maryland Baltimore County, arXiv:1512. 08048, Dec. 25, 2015, pp. 1-10.

International Search Report dated Feb. 12, 2019 in PCT/JP2018/047278 filed on Dec. 21, 2018.

* cited by examiner

| SERIAL NUMBER | TIME | TYPE | DATA 1 | DATA 2 | DATA 3 | LABEL |
|---|---|---|---|---|---|---|
| 1 | 0'00" | 1 | 0 | 3 | 0 | NORMAL |
| | 0'05" | 1 | 0 | 4 | 0 | NORMAL |
| | 0'05" | 2 | 1 | 1 | - | NORMAL |
| | 0'06" | 1 | 1 | 5 | 0 | NORMAL |
| | 0'10" | 2 | 1 | 1 | - | NORMAL |
| 2 | 0'00" | 1 | 0 | 1 | 0 | NORMAL |
| | 0'01" | 1 | 1 | 2 | 0 | NORMAL |
| | 0'05" | 2 | 1 | 1 | - | NORMAL |
| ... | | | ... | | | |

FIG. 4

EXTRACT DATA 1 WHOSE "TYPE" IS 1

| SERIAL NUMBER | TIME | TYPE | DATA 1 | DATA 2 | DATA 3 | LABEL |
|---|---|---|---|---|---|---|
| 1 | 0'00" | 1 | 0 | 3 | 0 | NORMAL |
|   | 0'05" | 1 | 0 | 4 | 0 | NORMAL |
|   | 0'05" | 2 | 1 | 1 | - | NORMAL |
|   | 0'06" | 1 | 1 | 5 | 0 | NORMAL |
|   | 0'10" | 2 | 1 | 1 | - | NORMAL |
| 2 | 0'00" | 1 | 0 | 5 | 0 | NORMAL |
|   | 0'01" | 1 | 1 | 6 | 0 | NORMAL |
|   | 0'05" | 2 | 1 | 1 | - | NORMAL |
| ... |  |  |  |  |  |  |

| SERIAL NUMBER | TIME | DATA 1 | LABEL |
|---|---|---|---|
| 1 | 0'00" | 0 | NORMAL |
|   | 0'05" | 0 | NORMAL |
|   | 0'06" | 1 | NORMAL |
| 2 | 0'00" | 0 | NORMAL |
|   | 0'01" | 1 | NORMAL |
| ... |  | ... |  |

FIG. 5

| SERIAL NUMBER | DATA | TRANSMISSION INTERVAL | LABEL |
|---|---|---|---|
| 1 | 0 | - | NORMAL |
|   | 0 | 0'05" | NORMAL |
| 2 | 0 | - | NORMAL |
|   | 1 | 0'01" | NORMAL |
| 3 | 0 | - | NORMAL |
|   | 1 | 0'01" | NORMAL |
| ... |   |   |   |

FIG. 6

CREATE PARTIAL SEQUENCE USING TWO CONSECUTIVE PIECES OF DATA

| SERIAL NUMBER | TIME | DATA | LABEL |
|---|---|---|---|
| 1 | 0'00" | 0 | NORMAL |
|   | 0'05" | 0 | NORMAL |
|   | 0'06" | 1 | NORMAL |
| 2 | 0'00" | 0 | NORMAL |
|   | 0'01" | 1 | NORMAL |
| ... |   |   |   |

| SERIAL NUMBER | TIME | TYPE | DATA 1 | DATA 2 | DATA 3 |
|---|---|---|---|---|---|
| 1 | 0'00" | 1 | 0 | 3 | 0 |
| | 0'05" | 1 | 0 | 4 | 0 |
| | 0'05" | 2 | 1 | 1 | - |
| | 0'06" | 1 | 1 | 5 | 0 |
| | 0'10" | 2 | 1 | 1 | - |
| 2 | 0'00" | 1 | 0 | 5 | 0 |
| | 0'01" | 1 | 1 | 6 | 0 |
| | 0'05" | 2 | 1 | 1 | - |
| ... | | | ... | | |

FIG. 8

| SERIAL NUMBER | DATA | TRANSMISSION INTERVAL | LABEL |
|---|---|---|---|
| 1 | 0 | - | NORMAL |
| | 0 | 0'05" | NORMAL |
| 2 | 0 | - | NORMAL |
| | 1 | 0'01" | NORMAL |
| ... | | | |

PARTIAL SEQUENCE CREATED FROM KNOWN COMMUNICATION DATA

| SERIAL NUMBER | DATA | TRANSMISSION INTERVAL | DETECTION RESULT |
|---|---|---|---|
| 1 | 0 | - | NORMAL |
| | 1 | 0'01" | |
| ... | | | |

PARTIAL SEQUENCE CREATED FROM OBJECT COMMUNICATION DATA

IDENTICAL

Partial sequence created from known communication data

| SERIAL NUMBER | DATA | TRANSMISSION INTERVAL |
|---|---|---|
| 1 | 0 | - |
|   | 0 | 0'05" |
| 2 | 0 | - |
|   | 1 | 0'01" |
| 3 | 0 | - |
|   | 1 | 0'01" |
| 4 | 0 | - |
|   | 1 | 0'01" |
| 5 | 0 | - |
|   | 1 | 0'01" |
| 6 | 0 | - |
|   | 0 | 0'01" |
| ... |   |   |

Conditional probability of second data

| CONDITION | | PROBABILITY |
|---|---|---|
| FIRST DATA | TRANSMISSION INTERVAL | |
| 0 | 0'05" | 1.0 |
| 1 | 0'01" | 0.8 |
| 0 | 0'01" | 0.2 |

Partial sequence created from object communication data

| SERIAL NUMBER | DATA | TRANSMISSION INTERVAL | DETECTION RESULT |
|---|---|---|---|
| 1 | 0 | - |  |
|   | 1 | 0'01" | NORMAL |
| 2 | 0 | - |  |
|   | 0 | 0'01" | ATTACK |
| ... |   |   |   |

FIG. 11

| SERIAL NUMBER | DATA 1 | DATA 2 | TRANSMISSION INTERVAL | DETECTION RESULT |
|---|---|---|---|---|
| 1 | 0 | 5 | - | ATTACK |
|  | 1 | 6 | 0'01" |  |
| ... |  |  | ... |  |

PARTIAL SEQUENCE CREATED FROM OBJECT COMMUNICATION DATA

| SERIAL NUMBER | DATA 1 | DATA 2 | TRANSMISSION INTERVAL |
|---|---|---|---|
| 1 | 0 | 3 | - |
|  | 0 | 4 | 0'05" |
| 2 | 0 | 4 | - |
|  | 1 | 5 | 0'01" |
| ... |  |  | ... |

PARTIAL SEQUENCE CREATED FROM KNOWN COMMUNICATION DATA

| SERIAL NUMBER | DATA | TRANSMISSION INTERVAL |
|---|---|---|
| 1 | 0 | - |
|  | 1 | 0'05" |
| 2 | 3 | - |
|  | 4 | 0'05" |
| ... | ... | ... |

PARTIAL SEQUENCE CREATED FROM KNOWN COMMUNICATION DATA

| SERIAL NUMBER | DATA | TRANSMISSION INTERVAL | DETECTION RESULT |
|---|---|---|---|
| 1 | 10 | - |  |
|  | 11 | 0'05" | ATTACK |
| ... | ... | ... |  |

PARTIAL SEQUENCE CREATED FROM OBJECT COMMUNICATION DATA

FIG. 12

| SERIAL NUMBER | AMOUNT OF CHANGE | TRANSMISSION INTERVAL |
|---|---|---|
| 1 | - | - |
|   | 1 | 0'05" |
| 2 | - | - |
|   | 1 | 0'05" |
| ... |   |   |

PARTIAL SEQUENCE CREATED FROM KNOWN COMMUNICATION DATA

| SERIAL NUMBER | AMOUNT OF CHANGE | TRANSMISSION INTERVAL | DETECTION RESULT |
|---|---|---|---|
| 1 | - | - | NORMAL |
|   | 1 | 0'05" |   |
| ... |   |   |   |

PARTIAL SEQUENCE CREATED FROM OBJECT COMMUNICATION DATA

FIG. 13

| SERIAL NUMBER | DATA | TRANSMISSION INTERVAL |
|---|---|---|
| 1 | 0 | - |
|  | 10 | 0'05" |
| 2 | 10 | - |
|  | 20 | 0'05" |
| ... | ... | ... |

PARTIAL SEQUENCE CREATED FROM KNOWN COMMUNICATION DATA

| SERIAL NUMBER | DATA | TRANSMISSION INTERVAL | DETECTION RESULT |
|---|---|---|---|
| 1 | 0 | - |  |
|  | 11 | 0'05" | ATTACK |
| ... | ... | ... |  |

PARTIAL SEQUENCE CREATED FROM OBJECT COMMUNICATION DATA

| SERIAL NUMBER | SET | TRANSMISSION INTERVAL | DETECTION RESULT |
|---|---|---|---|
| 1 | 1 | - | NORMAL |
|  | 2 | 0'05" |  |
| ... |  | ... |  |

PARTIAL SEQUENCE CREATED FROM OBJECT COMMUNICATION DATA

| DATA | SET |
|---|---|
| 0 TO 5 | 1 |
| 6 TO 15 | 2 |
| 16 TO 25 | 3 |

| SERIAL NUMBER | SET | TRANSMISSION INTERVAL |
|---|---|---|
| 1 | 1 | - |
|  | 2 | 0'05" |
| 2 | 2 | - |
|  | 3 | 0'05" |
| ... |  | ... |

PARTIAL SEQUENCE CREATED FROM KNOWN COMMUNICATION DATA

FIG. 17

| CAN-ID | LOCATION |
|--------|----------|
| 0x1AA  | 1        |
| 0x2BB  | 2, 4     |
| ..     | ..       |

EXAMPLE OF OBJECT DATA EXTRACTION RULE

FIG. 20

| CAN-ID | LOCATION | TYPE | NUMBER OF INPUTS |
|---|---|---|---|
| 0x1AA | 1 | DIFFERENCE | 4 |
| 0x2BB | 2 | SET [0-63, 64-127, 128-255] | 3 |
| 0x2BB | 4 | LITERAL | 2 |
| 0x3DD | 3 | LITERAL AND CONCATENATION | 3 |
| 0x3DD | 5 | LITERAL AND CONCATENATION | |

FIG. 21

DETECTION DEVICE, DETECTION METHOD, AND PROGRAM

TECHNICAL FIELD

The present invention relates to a detection device, a detection method, and a program that detect predetermined communication data from a sequence of communication data which is transmitted in a network incorporated into machinery such as vehicles, machine tools, construction equipment, and agricultural machinery, a communication device connected to the network, and a communication system configured therewith.

BACKGROUND ART

A plurality of electronic control units (ECUs) are incorporated into some machinery such as vehicles (for example, automobiles, special-purpose vehicles, motorcycles, and bicycles), machine tools, construction equipment, and agricultural machinery, and Controller Area Network (CAN) is a representative example that is used in a communication network between these ECUs. The network configuration of CAN is what is called a bus-type configuration in which a communication line of each ECU is shared. As a communication procedure on the bus of the ECUs, carrier sense multiple access/collision avoidance (CSMA/CA), that is, a procedure by which, when a communication collision occurs, communications are sequentially transmitted in the order of priority from highest to lowest is used. A communication of each ECU on CAN contains an ID, and the TD is used for identification of, for example, the priority of communication arbitration, the contents of a payload, and a transmission node. For each ID, any one of 1- to 8-byte lengths in 1-byte increments is defined as the length of a payload, and a designer can specify the contents of a payload at will.

The risk of cyberattacks on these vehicle equipment communication networks is suggested. It is known that attack transmission with an ID related to a function to be attacked is inserted by means such as connecting an unauthorized ECU to the network or unauthorized alteration of operation of the existing ECU, which can cause unauthorized operation of the function to be attacked.

As a method of detecting these attack communications, there are a method focusing attention on a communication interval and a method focusing attention on the order relation between payloads. As a technique focusing attention on a communication interval, Non-patent Literature 1 is known. In Non-patent Literature 1, an attack is detected based on a deviation of the communication interval between IDs, which are transmitted periodically, from a period. As a technique focusing attention on the order relation between payloads, Non-patent Literature 2 is known. In Non-patent Literature 2, a speed and opening and closing of a door are treated as states, the transition of a state is converted into a model using a hidden Markov model, and the transition of a state whose probability of occurrence is low is detected as an attack.

PRIOR ART LITERATURE

Non-Patent Literature

Non-patent Literature 1: Otsuka and Ishigooka, "Intrusion Detection for In-vehicle Networks without Modifying Legacy ECUs", IPSJ SIG Technical Report, Vol. 2013-EMB-28, No. 6, pp. 31-35, 2013.

Non-patent Literature 2: S. N. Narayanan, S. Mittal, and A. Joshi. "Using Data Analytics to Detect Anomalous States in Vehicles", arXiv:1512.08048, 2015.

SUMMARY OF THE INVENTION

Problems to be Solved by the Invention

However, with the existing attack communication detection technique, it is difficult to detect an attack communication targeted at an ID (hereinafter referred to as a periodic and event-related ID) which is transmitted periodically and also in conjunction with an event such as an operation that is performed by a driver. Specifically, in the case of a periodic and event-related ID, when an event occurs, the communication interval deviates from a period as in the case of an attack; therefore, with the method focusing attention on a communication interval, it is impossible to differentiate between a normal event and an attack communication. Also with the method focusing attention on the order relation between payloads, if an attacker inserts an attack communication so as to be identical to the transition of a payload caused by an authorized event, it is impossible to detect the attack communication.

Therefore, an object of the present invention is to provide a detection device, a detection method, and a program that detect an inserted attack communication targeted at a periodic and event-related TD by focusing attention on both the order relation between payloads and a communication interval.

Means to Solve the Problems

In order to solve the above-described problem, according to an aspect of the present invention, a detection device includes: an object data extraction unit that extracts, on the assumption that the same serial number is assigned to a series of pieces of communication data, from one or more pieces of communication data which are transmitted from one or more electronic control units, at least part of a payload contained in communication data that satisfies a predetermined condition, information by which the communication interval between the communication data can be calculated, and a serial number of the communication data as object data; a partial sequence creation unit that creates, using the extracted object data, a partial sequence containing information corresponding to at least part of a payload and information indicating a communication interval from two or more pieces of object data with the same serial number; and a detection unit that detects, using the created partial sequence, predetermined communication data based on the order relation between at least part of a payload and the corresponding part of another payload and a communication interval. The predetermined condition is a condition for extracting only communication data which is transmitted periodically and also in conjunction with a predetermined event.

Effects of the Invention

According to the present invention, it is possible to detect an inserted attack communication targeted at a periodic and event-related ID.

BRIEF DESCRIPTION OF THE DRAWINGS

FIG. 4 is a diagram showing a data example of known communication data.

FIG. 5 is a diagram for explaining processing which is performed by an object data extraction unit.

FIG. 6 is a diagram for explaining processing which is performed by a partial sequence creation unit.

FIG. 8 is a diagram showing a data example of object communication data.

FIG. 9 is a diagram for explaining processing which is performed by a detection unit (a first detection example).

FIG. 10 is a diagram for explaining processing which is performed by the detection unit (a second detection example).

FIG. 11 is a diagram for explaining processing which is performed by the detection unit (a third detection example).

FIG. 12 is a diagram for explaining processing which is performed by the detection unit (a fourth detection example).

FIG. 13 is a diagram for explaining the processing which is performed by the detection unit (the fourth detection example).

FIG. 14 is a diagram for explaining processing which is performed by the detection unit (a fifth detection example).

FIG. 15 is a diagram for explaining the processing which is performed by the detection unit (the fifth detection example).

FIG. 17 is a diagram for explaining the difference between the fourth detection example and the fifth detection example of the detection unit.

FIG. 20 is a diagram showing an example of an object data extraction rule.

FIG. 21 is a diagram showing an example of a partial sequence generation rule.

DETAILED DESCRIPTION OF THE EMBODIMENTS

Figure 1:
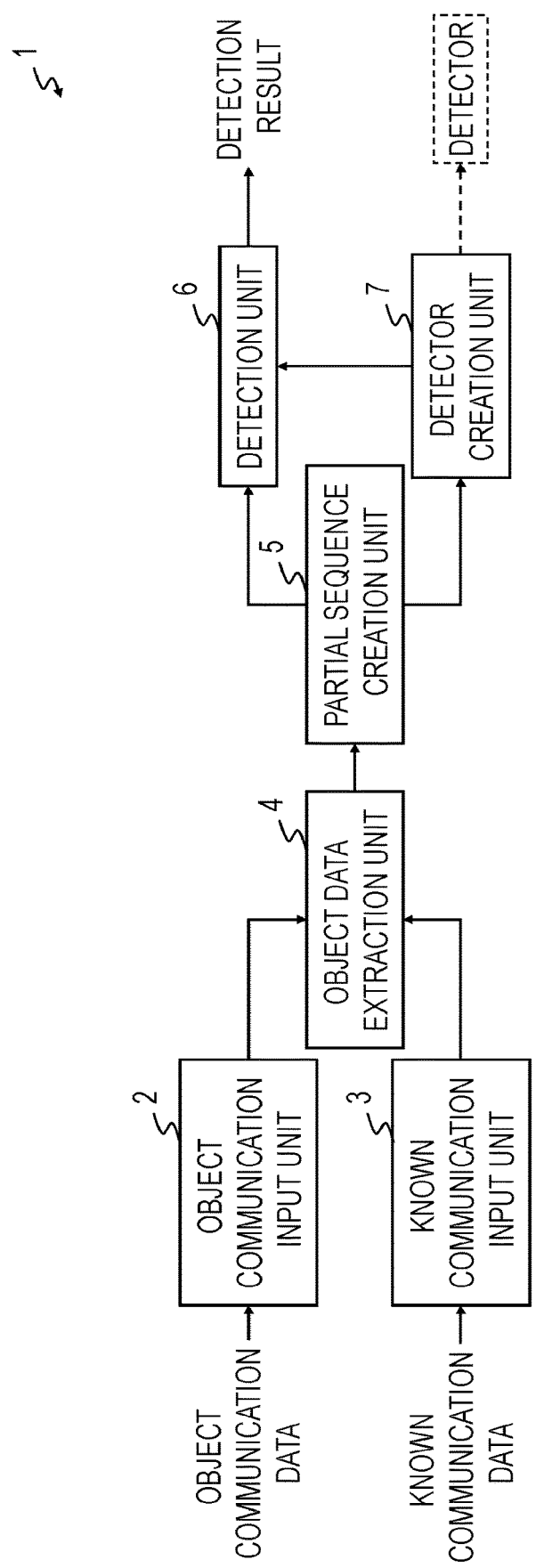
FIG. 1 is a functional block diagram of a detection device according to a first embodiment.

Hereinafter, an embodiment of the present invention will be described. It is to be noted that, in the drawings which are used in the following description, component units having the same function and steps in which the same processing is performed are identified with the same reference characters and overlapping explanations are omitted. In the following description, it is assumed that processing which is performed element by element of a vector and a matrix is applied to all the elements of the vector and the matrix unless otherwise specified.

First Embodiment

FIG. 1 shows a functional block diagram of a detection device 1 according to a first embodiment.

The detection device 1 includes an object communication input unit 2, a known communication input unit 3, an object data extraction unit 4, a partial sequence creation unit 5, a detection unit 6, and a detector creation unit 7.

The detection device 1 is a special device configured as a result of a special program being read into a publicly known or dedicated computer including, for example, a central processing unit (CPU), a main storage unit (random access memory: RAM), and so forth. The detection device 1 executes each processing under the control of the central processing unit, for example. The data input to the detection device 1 and the data obtained by each processing are stored in the main storage unit, for instance, and the data stored in the main storage unit is read into the central processing unit when necessary and used for other processing. At least part of each processing unit of the detection device 1 may be configured with hardware such as an integrated circuit. Each storage of the detection device 1 can be configured with, for example, a main storage unit such as random access memory (RAM), an auxiliary storage unit configured with a hard disk, an optical disk, or a semiconductor memory device such as flash memory, or middleware such as a relational database or a key-value store.

Figure 2:
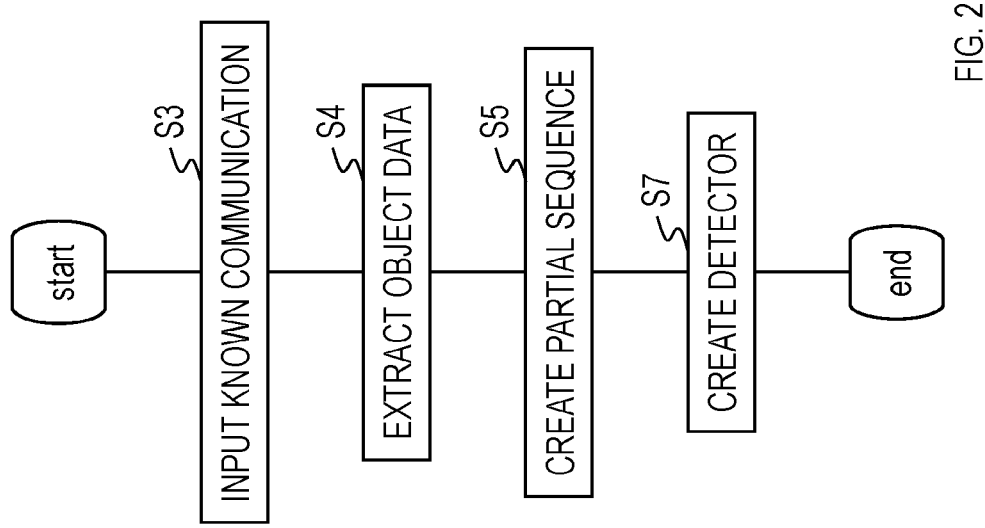
FIG. 2 is a diagram showing an example of a processing flow of a learning phase of the detection device according to the first embodiment.
Figure 3:
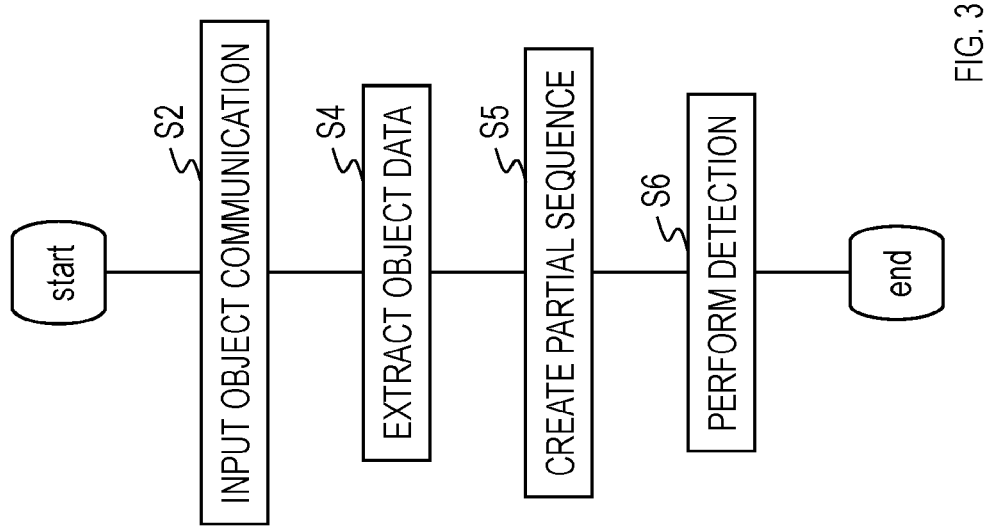
FIG. 3 is a diagram showing an example of a processing flow of a detection phase of the detection device according to the first embodiment.

The detection device 1 has a learning phase and a detection phase. FIG. 2 shows a processing flow of the learning phase and FIG. 3 shows a processing flow of the detection phase.

In the learning phase, the detection device 1 generates a detector using known communication data as input and sets the generated detector in the detection unit 6.

In the detection phase, the detection device 1 detects, using object communication data as input, predetermined communication data by using the detector and outputs a detection result.

It is to be noted that the phases may be implemented by different devices. In that case, a device (hereinafter also referred to as a learning device) which implements the learning phase does not have to include the object communication input unit 2 and the detection unit 6. A detection device which implements the detection phase does not have to include the known communication input unit 3 and the detector creation unit 7.

[Learning Phase]

First, the details of processing which is performed by each unit in the learning phase will be described using FIGS. 1 and 2.

<Known Communication Input Unit 3>

The known communication input unit 3 accepts, as input, communication data which is known to be normal or communication data which is known to be an attack (hereinafter also referred to collectively as known communication data) (S3) and outputs the known communication data.

FIG. 4 shows an example of the known communication data. The known communication data contains a serial number, a time, a data type, a source, a destination, one or more pieces of data, and a label. At least one of the data type, the source, and the destination only has to be contained in the known communication data; two or more of them may be contained in the known communication data. FIG. 4 is an example in which the known communication data contains the data type. When only communications of the same data type, source, or destination are contained in the known communication data, all the information on the data type, source, or destination do not have to be contained in the known communication data. The reason is as follows: the data type, source, or destination of the known communication data is fixed and there is no need for differentiation. As the serial number, the same number is assigned to communication data (a series of pieces of communication data) contained in the same log. As the time, a time such as 2017/10/30 12:00 can be used; the time may be, for example, a time elapsed since recording of a log was started, as long as the time is information by which a communication interval can be calculated. As the data type, a CAN ID or the like can be used; any information may be used as long as the information is information by which communications of the same data type can be identified. As the source and the destination, any information may be used as long as the information is information by which communications of the same source or destination can be identified. As the data, a numerical value can be used; data in other forms such as a character string may be used. The number of pieces of data contained in one communication may vary by data type; however, communications of the same data type have to contain the same number of pieces of data. As the label, "normal", "attack", and the like can be used; the label may be "insertion", "rewriting", "deletion", and the like. The label is supposed to be recorded for each communication; the label may be recorded for each serial number or for each group of some communications of communications with the same serial number. When all the labels of the known communication data are fixed, such as "normal" or "attack" (when all the labels of the known communication data correspond to one label and are unified into one label), the known communication data does not have to contain the label.

<Object Data Extraction Unit 4>

The object data extraction unit 4 extracts, using, as input, the known communication data (hereinafter also referred to simply as the communication data) accepted by the known communication input unit 3, at least part of a payload contained in communication data that satisfies a predetermined condition, information by which the communication interval between the communication data can be calculated, and the serial number and the label of the communication data from one or more pieces of communication data as object data (S4) and outputs the object data. Hereinafter, at least part of a payload is also referred to simply as data. It is to be noted that there is no need to extract communication data that does not satisfy the predetermined condition. For example, a method may be adopted by which, as the object data which is extracted, data whose number of types of values which the data can take on is less than or equal to a predetermined threshold is used as an object to be extracted; other extraction conditions may be manually set in advance.

As the predetermined condition, the following conditions, for instance, can be adopted:
(1) the number of types of values which data contained in communication data can take on is less than or equal to a threshold;
(2) at least one of the type of data contained in communication data, the source of the communication data, and the destination of the communication data is a predetermined type of data, source, or destination; and
(3) at least one of the type of data contained in communication data, the source of the communication data, and the destination of the communication data changes in a predetermined manner.

FIG. 5 shows an example of extraction of inspection object data.

By setting up such a condition, only periodic and event-related communication data is extracted. In other words, the predetermined condition is a condition for extracting only periodic and event-related communication data. It is to be noted that periodic and event-related communication data is communication data that is transmitted (occurs) periodically and also in conjunction with a predetermined event (for instance, a change in opening and closing of a door or a change in the ON/OFF state of a light).

In the case of the above-described condition (1), only periodic and event-related communication data is extracted by using the following feature: the number of types of values which data contained in periodic and event-related communication data can take on is generally small. It is to be noted that the "number of types of values which data can take on" is, for example, 2 if values that certain data can take on are 0 and 1 and 200 if certain data can take on values from 0 to 199 in steps of 1.

Moreover, when the identification of the data type, source, destination, or data which is produced by the occurrence of a particular event is completed, only periodic and event-related communication data is extracted by setting the above-described condition (2).

Furthermore, when the identification of the data type, source, destination, or data which changes in conjunction with the occurrence of a particular event is completed, only periodic and event-related communication data is extracted by setting the above-described condition (3).

In the case of the above-described conditions (2) and (3), since a particular data type or the like is produced or a particular data type or the like changes only when an event occurs, it is possible to improve the accuracy of extraction. It is to be noted that, when communication data of a plurality of data types, sources, or destinations is extracted, the condition only has to be set so that these communication data can be extracted. For instance, a condition: "type"=1 or "type"=2 only has to be set as the predetermined condition.

When a plurality of pieces of data are contained in a payload contained in communication data, predetermined data only has to be set as at least part of a payload described above. For example, in the example of FIG. 5, of data 1, data 2, and data 3 which are contained in communication data, data 1 is set as part of a payload.

<Partial Sequence Creation Unit 5>

The partial sequence creation unit 5 creates, using the object data extracted by the object data extraction unit 4, a partial sequence containing information corresponding to data, information indicating a communication interval, and a label from two or more pieces of object data with the same serial number (S5) and outputs the partial sequence.

Figure 7:
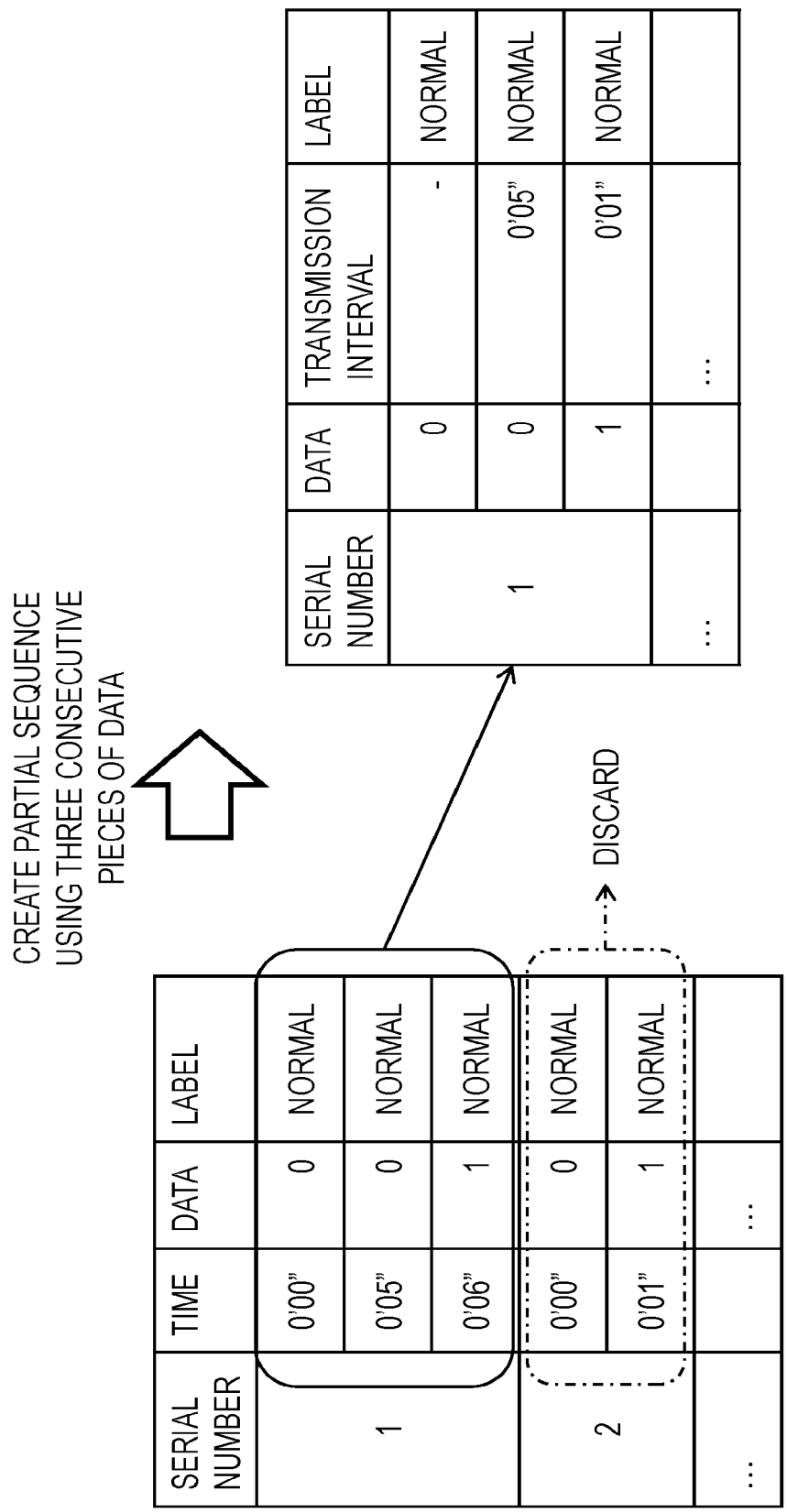
FIG. 7 is a diagram for explaining the processing which is performed by the partial sequence creation unit.

FIGS. 6 and 7 show examples of the creation of a partial sequence.

For example, the partial sequence creation unit 5 creates a partial sequence by extracting a plurality of pieces of object data from a sequence of object data with the same serial number.

For instance, the partial sequence creation unit 5 may create a partial sequence using a predetermined number of consecutive pieces of object data; alternatively, the partial sequence creation unit 5 may create a partial sequence using object data transmitted within a predetermined period of time. When the partial sequence creation unit 5 creates a partial sequence using a predetermined number of consecutive pieces of object data, the partial sequence creation unit 5 may be configured so that, if there are not a predetermined number of pieces of object data, the partial sequence creation unit 5 does not create a partial sequence from the object data (see FIG. 7). When a sequence of object data contains a plurality of data types, sources, or destinations, the partial sequence creation unit 5 may create a partial sequence in such a way that the partial sequence contains the plurality of data types, sources, or destinations in a mixed manner or may create a partial sequence for each data type, source, or destination.

When a sequence of object data contains object data from a plurality of data types, sources, or destinations, information on these data types, sources, or destinations may be contained in a partial sequence.

The partial sequence creation unit 5 calculates a communication interval from the information, which is contained in object data and by which the communication interval between communication data can be calculated, and includes the communication interval in a partial sequence as part thereof. For instance, the partial sequence creation unit 5 calculates, from the transmission times of two pieces of communication data, the communication interval between the two pieces of communication data and includes the communication interval in a partial sequence as part thereof. The partial sequence creation unit 5 may calculate (i) a difference between the time of communication data and the time of the immediately preceding communication data in a partial sequence or (ii) a difference between the time of communication data and the time of the immediately preceding communication data from the same data type, source, or destination. Furthermore, the partial sequence creation unit 5 may use, as a communication interval, not only a difference between the time of data and the time of the immediately preceding data, but also (iii) a difference between the time of the current data and the time of the second or third data previous to the current data. As the information indicating a communication interval, the above-described (i) to (iii) and the like, for example, can be used.

As the information corresponding to data, for example, information indicating (a) data itself, (b) the amount of change between two pieces of data, and (c) a set, of a plurality of sets created by performing a classification of values which data can take on, to which data belongs can be used.

<Detector Creation Unit 7>

The detector creation unit 7 creates a detector, using the partial sequences created based on the known communication data as input, by using these values (S7) and outputs the detector. The detector is what is configured so as to output a detection result (normal, an attack, or the like) when input data (in the present embodiment, a partial sequence created from the object communication data) is input thereto. Since the detector is used in the detection unit 6 and created in accordance with a method of detection, a method for creating the detector will be described in the explanation of the detection unit 6.

The detector created in the learning phase is set in the detection unit 6 of the same device or another device before moving to the detection phase.

[Detection Phase]

Next, the details of processing which is performed by each unit in the detection phase will be described using FIGS. 1 and 3.

<Object Communication Input Unit 2>

The object communication input unit 2 accepts communication data which is an object to be subjected to detection (object communication data) as input (S2) and outputs the object communication data.

FIG. 8 shows an example of the object communication data. The types of information contained in the object communication data are the same as the types of information contained in the known communication data, for example; however, the object communication data does not contain a label.

<Object Data Extraction Unit 4 and Partial Sequence Creation Unit 5>

The processing S4 and S5 which is performed in the object data extraction unit 4 and the partial sequence creation unit 5 is the same as the processing S4 and S5 in the learning phase except that an object to be processed is data based on the object communication data, not data based on the known communication data. It is to be noted that, since processing is performed on data based on the object communication data that does not contain a label, processing which is performed on a label is not performed.

<Detection Unit 6>

The detection unit 6 detects, using the partial sequence created based on the object communication data as input, predetermined communication data by using these values and the detector based on the order relation and the communication interval between data (S6) and outputs a detection result (an attack, normal, or the like). It is to be noted that the order relation here means a temporal order relation.

Hereinafter, examples of the detection method and the detector will be described. In the following detection examples, as predetermined communication data, communication data which is considered to be an attack is detected; other communication data ("normal", "attack", "insertion", "rewriting", "deletion", or the like) may be detected in accordance with a use.

(First Detection Example)

The detection unit 6 detects predetermined communication data based on whether there is a partial sequence identical to a partial sequence created from the object communication data in the partial sequences created from the known communication data.

In this case, the partial sequences created from the known communication data are stored in an unillustrated storage in advance. The detector searches the unillustrated storage, using a partial sequence created from the object communication data as input, for a partial sequence identical to the partial sequence created from the object communication data, obtains a detection result based on the search result, and outputs the detection result. The detector creation unit 7 creates the detector including a database consisting of the partial sequences created from the known communication data and a search function of searching the database for a partial sequence created from the object communication data. FIG. 9 is a diagram for explaining the first detection example.

In the example of FIG. 9, since a partial sequence with serial number 2 created from the known communication data is identical to a partial sequence with serial number 1 created from the object communication data and the label of the partial sequence with serial number 2 created from the known communication data is normal, this partial sequence created from the object communication data is judged to be normal. When an attack is detected, this object communication data is not detected as an attack.

For example, when the label of a partial sequence created from the known communication data is an attack, a partial sequence created from the object communication data, which is identical to that partial sequence, is judged to be an attack and is detected.

For instance, when all the labels of the known communication data are fixed, such as "normal" (when all the labels of the known communication data are unified into one label) and therefore the known communication data does not contain a label, if a partial sequence identical to a partial sequence created from the object communication data is present in the unillustrated storage, the label of that partial sequence is judged to be identical to the unified label (such as "normal").

In the following detection examples, an example in which only normal communication data is used as the known communication data is shown; alternatively, an abnormality detection technique using normal and attack communication data may be applied. Moreover, a detection rule may be created in advance from a design specification or a specification and detection may be performed in accordance with the rule.

(Second Detection Example)

An attack may be detected by creating the detector using a machine learning technique such as a Bayesian network or a neural network. A model for detecting predetermined communication data is learned by using a machine learning technique such as a Bayesian network or a neural network and a detection result is obtained by using this model.

The behavior in a case where a Bayesian network is used is shown (see FIG. 10). In FIG. 10, it is assumed that an abnormality detection technique is applied using only normal communication data as the known communication data, and a label is omitted. In the Bayesian network, first, the presence of the dependency between data and a communication interval contained in a partial sequence is inferred. In FIG. 10, an example of a case where the inference that the occurrence probability of the second data depends on the first data and a communication interval is made is shown. After the inference of the dependency is completed, the conditional probability is inferred from the known communication data. For instance, under the condition where the first data is "0" and a communication interval is "0'01'"', the second data becomes "1" four times and becomes "0" one time; thus, the probability that the second data becomes "1" is calculated as 4/(4+1)=0.8 and the probability that the second data becomes "0" is calculated as 1/(4+1)=0.2. The conditional probability may be obtained as described above or may be calculated based on a hypothetical prior probability distribution. Processing to obtain the conditional probability corresponds to learning of a model. In this way, the detector with a model including the Bayesian network is created using the known communication data.

In making a judgment on the object communication data, the detector uses a partial sequence created from the object communication data as input and outputs a detection result. For example, the detector infers, using a partial sequence as input, the conditional probability by the Bayesian network, and judges that, if the conditional probability of the second data of each partial sequence is greater than or equal to a threshold (for example, 0.3), the partial sequence is normal and judges that, if the conditional probability of the second data of each partial sequence is less than the threshold, the partial sequence is an attack. In the example of FIG. 10, a partial sequence with serial number 1 created from the object communication data is judged to be "normal" because the conditional probability is 0.8, which is greater than or equal to the threshold, and a partial sequence with serial number 2 is judged to be an attack because the conditional probability is 0.2, which is less than the threshold.

In this case, the detector creation unit 7 creates the detector including a model learned from a database consisting of the partial sequences created from the known communication data and a judgment function of obtaining a detection result based on an output value (a conditional probability), which is obtained by inputting a partial sequence created from the object communication data to a model, and a threshold by determining which one is greater.

It is to be noted that a model is not limited to the above-described model. The bottom line is that any model may be used as long as the model is a model by which predetermined communication data can be detected, and an output of the model may be used as a detection result. By learning a model using, as learning data, the known communication data containing a label such as an attack or normal, an output itself of the model is a detection result indicating an attack or normal, for example. In this case, the model itself corresponds to the detector.

(Third Detection Example)

FIG. 11 shows an attack detection example in a case where a plurality of independent pieces of data are contained.

In this example, data 2 that is independent of data 1 is contained in a partial sequence. For example, data 1 indicates a status value of ON/OFF of a light and data 2 indicates a counter that increments by 1 for each transmission. Since there is no partial sequence created from the known communication data which is identical to a partial sequence created from the object communication data, this partial sequence is detected as being an attack. However, the behavior of data 1 is normal because the behavior of data 1 is the same as that of FIG. 10. In addition, when data 2 is data that operates as a counter, the behavior of data 2 of a partial sequence created from the object communication data is also normal. Thus, it is incorrect to detect that the partial sequence of FIG. 11 is an attack. When only data 1 is extracted from this partial sequence, this partial sequence is identical to that of FIG. 10 and is judged to be normal, which makes it possible to prevent false detection. As described above, by limiting data which is an object to be subjected to inspection, it is possible to reduce the number of occurrences of false detection and improve the accuracy of detection.

In this case, the detector creation unit 7 learns a detection model, using the partial sequences (from which data 2 is removed) created from the known communication data, by a machine learning technique such as a Bayesian network or a neural network. The detection model is a model that uses a partial sequence (from which data 2 is removed) as input and outputs a detection result.

(Fourth Detection Example)

FIG. 13 shows a detection example based on the amount of change in data. A difference between a detection result in a case where data is used in its original form and a detection result in a case where the amount of change in data is used is shown using FIGS. 12 and 13. When data is used in its original form, since there is no partial sequence created from the known communication data which is identical to a partial sequence created from the object communication data, this partial sequence is detected as being an attack (see FIG. 12). If this data is data such as a speed, a partial sequence created from the object communication data indicates that the speed changes smoothly, which is a normal operation; therefore, the detection result is incorrect.

When the amount of change is calculated from these data, since the same partial sequence is present in the partial sequences created from the object communication data and the partial sequences created from the known communication data, this partial sequence is judged to be normal (FIG. 13). As described above, when variations in the amount of change are smaller than variations in the value of data such as a speed, by calculating the amount of change in data, it is possible to perform detection, focusing attention on the behavior such as an increase or decrease in data, which makes it possible to reduce the number of occurrences of false detection and improve the accuracy of detection.

In this case, the amount of change (for example, a difference) in data contained in a partial sequence is obtained in advance using the partial sequences created from the known communication data, and combinations of a serial number, the amount of change, and a transmission interval are stored in the unillustrated storage as new partial sequences. The detector uses a partial sequence created from the object communication data as input, obtains the amount of change in data contained in the partial sequence, includes it in a new partial sequence, searches the unillustrated storage for the new partial sequence created from the object communication data, obtains a detection result based on the search result, and outputs the detection result. The detector creation unit 7 creates the detector including a function of generating new partial sequences (combinations of a serial number, the amount of change, and a transmission interval) from the partial sequences created from the known communication data, a database consisting of the new partial sequences, a function of generating a new partial sequence (a combination of a serial number, the amount of change, and a transmission interval) from a partial sequence created from the object communication data, and a search function of searching the database for the new partial sequence generated based on the object communication data.

(Fifth Detection Example)

In FIG. 15, a detection example based on a set to which data belongs is shown. A difference between a detection result of a case where data is used in its original form and a case where detection is performed based on a set to which data belongs is shown using FIGS. 14 and 15. When data is used in its original form, since there is no partial sequence created from the known communication data which is identical to a partial sequence created from the object communication data, this partial sequence is detected as being an attack (see FIG. 14). When data is a value obtained from a sensor and an error may develop, a difference between numeric values enclosed in dashed rectangles in FIG. 14 is considered to be an error and it is incorrect to detect that this partial sequence is an attack. By performing detection based on a set to which data belongs, it is possible to tolerate this error, and this partial sequence is detected as being normal (see FIG. 15).

In this case, by using the partial sequences created from the known communication data, the data contained in a partial sequence is classified into two or more sets in advance, and combinations of a serial number, sets, and a transmission interval are stored in the unillustrated storage as new partial sequences. The detector uses a partial sequence created from the object communication data as input, classifies the data contained in the partial sequence into two or more sets, includes them in a new partial sequence, searches the unillustrated storage for the new partial sequence created from the object communication data, obtains a detection result based on the search result, and outputs the detection result. The detector creation unit 7 creates the detector including a function of generating new partial sequences (combinations of a serial number, sets, and a transmission interval) from the partial sequences created from the known communication data, a database consisting of the new partial sequences, a function of generating a new partial sequence (a combination of a serial number, sets, and a transmission interval) from a partial sequence created from the object communication data, and a search function of searching the database for the new partial sequence generated based on the object communication data.

Figure 16:
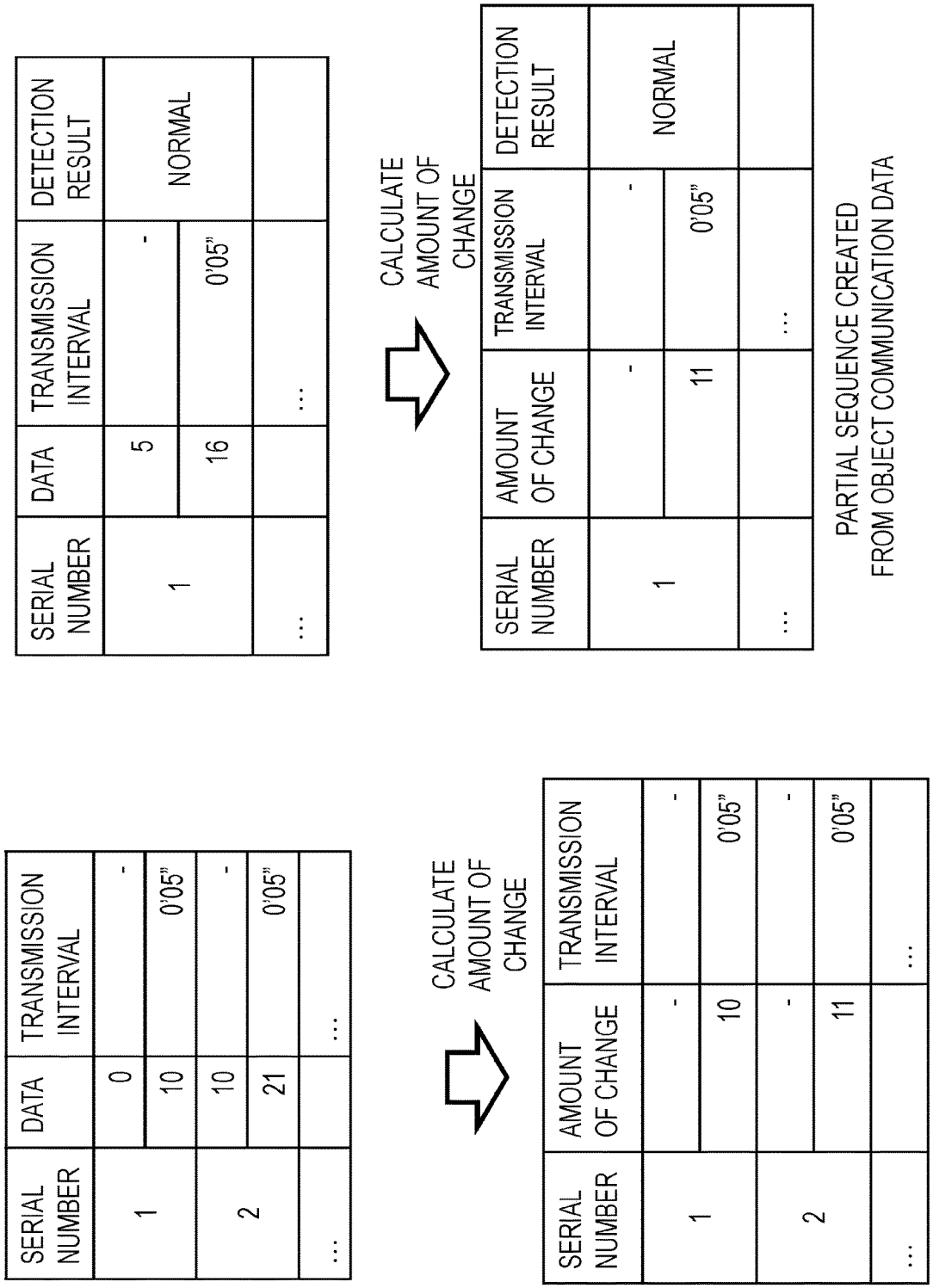
FIG. 16 is a diagram for explaining a difference between the fourth detection example and the fifth detection example of the detection unit.

A difference between a detection result in a case (the fourth detection example) where detection is based on the amount of change in data and a case (the fifth detection example) where detection is performed based on a set to which data belongs is shown using FIGS. 16 and 17. When detection is based on the amount of change in data, in the example of FIG. 16, since there is a partial sequence identical to a partial sequence created from the object communication data in the partial sequences created from the known communication data, this partial sequence is judged to be normal. When detection is based on a set to which data belongs, in the example of FIG. 17, since a change from set 1 to set 3 is not contained in the known communication data, this partial sequence is judged to be an attack. As described above, by performing detection based on a set to which data belongs, it is possible to detect an abnormal change in data while tolerating a small error in data and reduce the number of occurrences of false detection.

As described above, for data whose number of types of values which the data can take on is large, by using detection based on a set to which data belongs, it is possible to reduce the number of occurrences of false detection and the number of undetected attacks and improve the accuracy of detection. A set to which data belongs may be manually set, or classification may be performed using a technique such as clustering.

First Example

An example in which the first embodiment is applied to detection of cyberattacks in a vehicle-mounted system of an automobile will be described. A general procedure of the present example is as follows.

(Learning Phase)

(1-1) A vehicle for collection collects data of a vehicle which is operating normally.

(1-2) A learning system obtains, using the collected data of the vehicle as input, a set of normal partial sequences.

(Detection Phase)

(2) The set of normal partial sequences is installed in a vehicle for performing detection, and an abnormality which may occur in the vehicle by a cyberattack is detected and dealt with.

Hereinafter, specific operations will be described in accordance with the above-described procedure.

Figure 18:
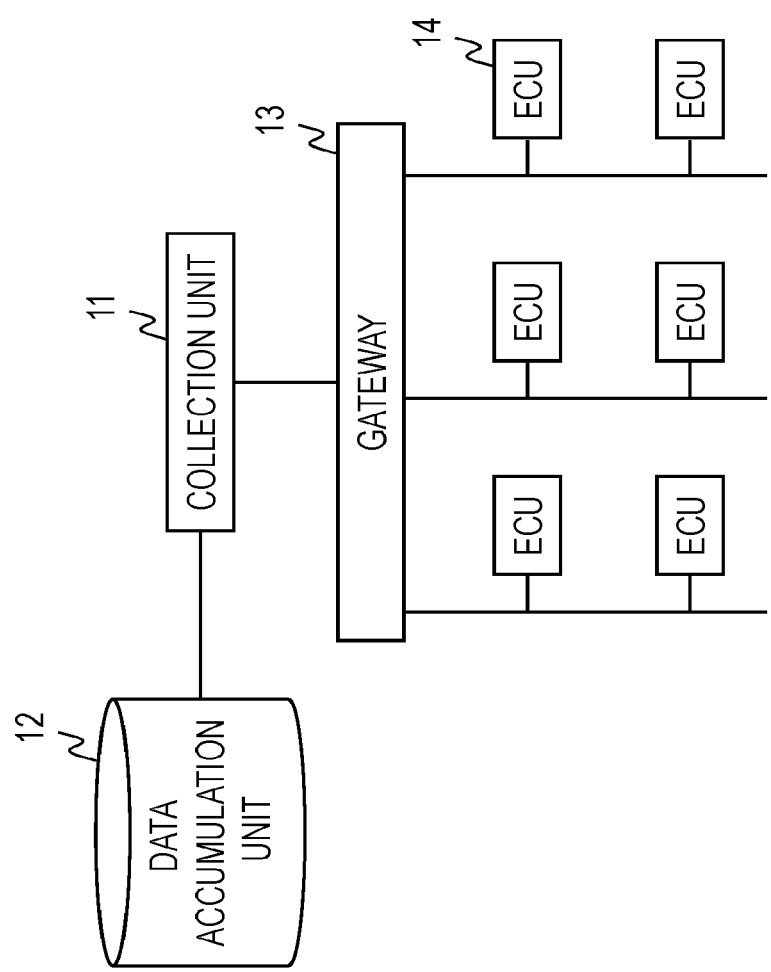
FIG. 18 is a diagram showing a configuration example of a vehicle-mounted system of a vehicle for collection.

A configuration example of a vehicle-mounted system of the vehicle for collection which is used in process (1-1) is shown in FIG. 18.

The vehicle-mounted system includes a collection unit 11, a data accumulation unit 12, a gateway 13, and one or more ECUs 14. In FIG. 18, each ECU 14 is a microprocessor for controlling and monitoring an automobile and has a unique function such as controlling a door lock, a brake, or an engine or observing data such as a vehicle speed, a vehicle outside temperature, or a tire pressure. The ECUs 14 are connected by a communication bus, and a control signal and observational data are exchanged in accordance with a CAN protocol. Each control signal and each observational data are referred to as a CAN message. One CAN message contains a CAN-ID corresponding to the type of a function with which the control signal or observational data is associated and one or more values of the control signal or observational data. The gateway 13 connects a plurality of buses and allows CAN messages to be exchanged between ECUs on the plurality of buses. The collection unit 11 is connected to the gateway 13, and observes all the CAN messages, which flow through all the buses, of all the ECUs 14 and records the CAN messages on the data accumulation unit 12. In doing so, the collection unit 11 records a time at which a CAN message was observed as a transmission time of the CAN message along with the contents (a CAN-ID and one or more values) of the CAN message. The vehicle equipped with the above system is made to actually run, and the CAN messages which the ECUs 14 transmit and receive are collected and accumulated. The collection operation may be divided into several operations and performed. In that case, a serial number is assigned to each of the operations into which the collection operation was divided, so that each group of accumulated CAN messages is managed by the serial number. The data accumulation unit 12 is configured with a magnetic disk, flash memory, or the like, which makes it possible to remove the data accumulation unit 12 itself from the vehicle for collection and connect the data accumulation unit 12 to another system. As a means to pass the accumulated data to another system, the data accumulation unit 12 may be provided with a communication interface so as to pass the accumulated data to another system by communication. Moreover, a media drive may be provided, so that the accumulated data is written into a portable medium by the media drive and the medium is inserted into another system and used.

The learning system which is used in process (1-2) can be configured by installing, on a commercially available personal computer or workstation, the known communication input unit 3, the object data extraction unit 4, the partial sequence creation unit 5, and the detector creation unit 7 according to the present embodiment as a software program. The principle of operation of the known communication input unit 3, the object data extraction unit 4, the partial sequence creation unit 5, and the detector creation unit 7 is as described above. Moreover, a storage medium of the personal computer or the workstation is used as the data accumulation unit 12 in which the groups of normal CAN messages collected in process (1-1) are stored, a rule accumulation unit 15 in which a rule which the object data extraction unit 4, the partial sequence creation unit 5, and the detector creation unit 7 refer to is stored, and a model accumulation unit 16 to which the result of process (1-2) is written out.

First, the groups of CAN messages, each having a transmission time, collected in process (1-1) are stored in the data accumulation unit 12 of the learning system, and object data extraction is performed using them as input. In extraction of object data, a data type on which data extraction is to be performed and data to be extracted are set in advance. In the present example, an object data extraction rule correlating a CAN-ID on which extraction is to be performed with the location of data, which is to be extracted, in values contained in a CAN message with the CAN-ID is stored in the rule accumulation unit 15. An example of the object data extraction rule is shown in FIG. 20. This example indicates that only first byte data of values of a CAN message whose CAN-ID is 0x1AA is extracted from the CAN message, and second byte data and fourth byte data of values of a CAN message whose CAN-TD is 0x2BB are extracted from the CAN message. This kind of rule may be set for all the CAN-IDs that can flow in the vehicle-mounted system of the vehicle or may be defined only for, for example, a CAN-ID strongly suspected of being attacked or a CAN-ID which exerts a significant influence if an attack is made thereon.

Partial sequence creation is performed on the object data extracted in this way. It is to be noted that, in the first embodiment, a partial sequence is created from the object data in the partial sequence creation unit 5 and a detector is created in the detector creation unit 7, the detector having a function of generating a new partial sequence (a combination of a serial number, the amount of change, and a transmission interval in the fourth detection example and a combination of a serial number, sets, and a transmission interval in the fifth detection example) from a partial sequence created from the communication data in accordance with a detection method; alternatively, a configuration may be adopted in which a partial sequence corresponding to the above-described new partial sequence is created directly from the object data in the partial sequence creation unit 5. In this case, the detector uses the new partial sequence as input and outputs a detection result. These two cases are the same in that the detection unit 6 detects, using a partial sequence created in the partial sequence creation unit 5, predetermined communication data based on the order relation and the communication interval between data. In this example, an example in which a partial sequence corresponding to the above-described new partial sequence is created directly from the object data will be described.

As described above, a plurality of policies can be adopted in the creation of a partial sequence. The plurality of policies are as follows, for example:

(1) a policy concerning the number of pieces of data on which attention is focused, such as focusing attention on a single piece of data (for example, only data 1) in a CAN message or focusing attention on a plurality of pieces of data (for example, data 1 and data 2) in a CAN message;

(2) a policy concerning conversion of data into a feature amount, such as focusing attention on a value itself of data contained in a CAN message, focusing attention on a difference (also corresponding to the above-described amount of change) in data contained in two CAN messages related to each other (for example, CAN messages which arrive consecutively and have the same CAN-ID), or focusing attention on groups (corresponding to the above-described sets) into which data is classified by classifying data contained in a CAN message into several groups in accordance with the value of the data;

(3) a policy concerning the number of input messages, such as how many CAN messages of CAN messages related to one another are combined and used for the creation of a partial sequence; and (4) a policy concerning the resolution of data, such as, when a plurality of pieces of data in one CAN message are extracted, creating different partial sequences from them or creating a common partial sequence by concatenating them.

In the present example, a partial sequence generation rule correlating a CAN-TD, on which extraction is to be performed, and the location of data extracted therefrom with a generation condition that defines how to create a partial sequence from those data is stored in the rule accumulation unit 15. An example of the partial sequence generation rule is shown in FIG. 21. In this example, as for data extracted from the first byte of a CAN message whose CAN-ID is 0x1AA, by calculating a difference between that data and the immediately preceding similar data and using, as a feature amount, the value thereof along with a difference (a transmission interval) between transmission times, a partial sequence is generated from four consecutive CAN messages. As for data extracted from the second byte of a CAN message whose CAN-ID is 0x2BB, a judgment on a range: a range from 0 to 63, a range from 64 to 127, or a range from 128 to 255, to which the value of the data belongs, is made and the order of the range to which the value of the data belongs (for example, if the value is 66, the value belongs to the second range) is used. As for data extracted from the fourth byte of a CAN message whose CAN-ID is also 0x2BB, the value of the data is used in its original form. Data in two locations is extracted from 0x2BB and different partial sequences are generated from them. On the other hand, the third byte and the fifth byte are extracted from 0x3DD, the value of each of these data is used in its original form and the values thereof are concatenated and used (as one piece of data), and a common partial sequence is generated.

A set of CAN-ID-by-CAN-ID normal partial sequences generated by performing the above processing on all the groups of CAN messages, each having a transmission time, stored in the data accumulation unit 12 is stored in the model accumulation unit 16.

Figure 19:
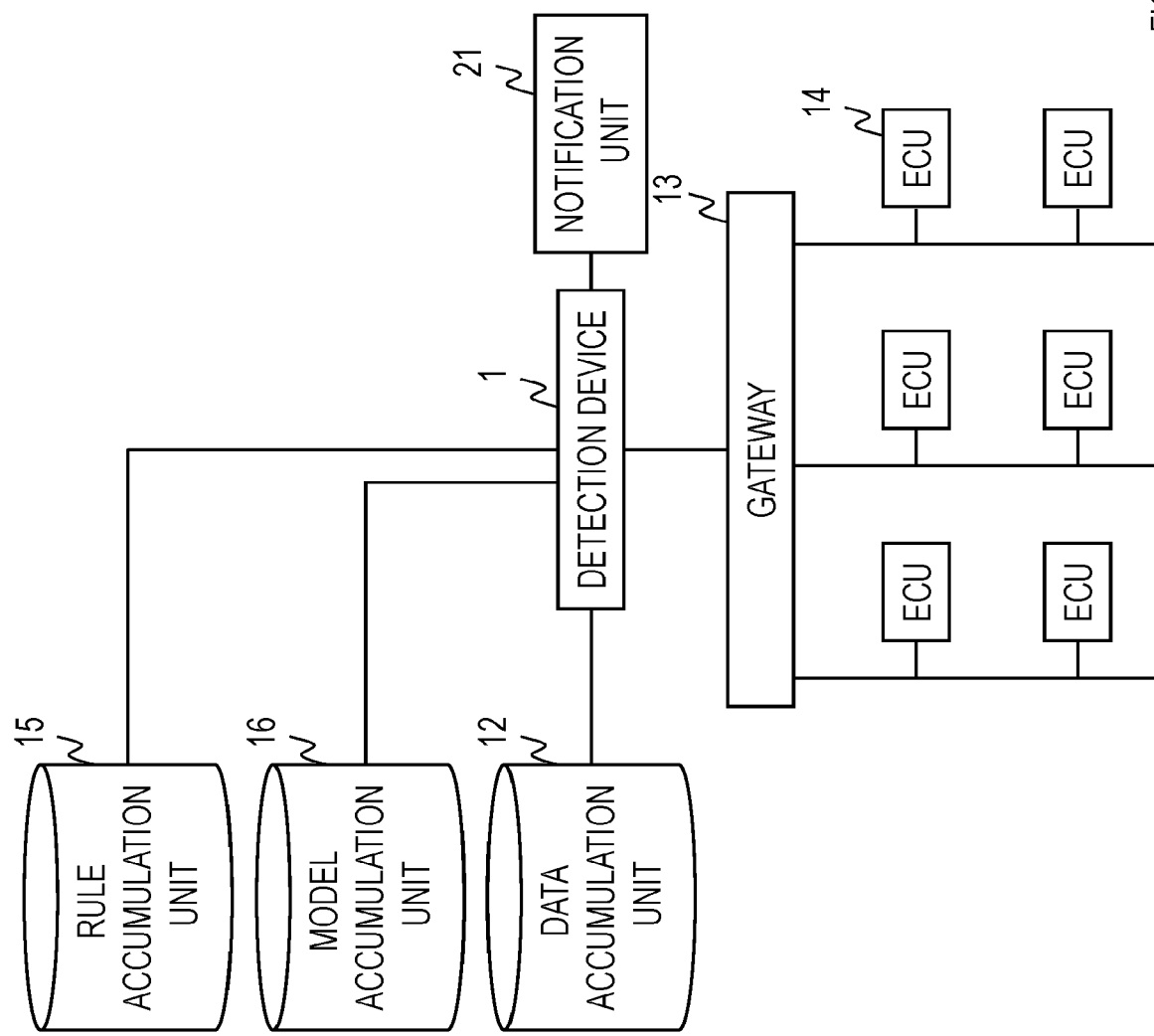
FIG. 19 is a diagram showing a configuration example of a vehicle-mounted system of a vehicle for performing detection.

A configuration example of a vehicle-mounted system of the vehicle for performing detection, which is used in process (2), is shown in FIG. 19. ECUs 14 and a gateway 13 in FIG. 19 are the same as those in FIG. 18. The rule accumulation unit 15 and the model accumulation unit 16 are storage media. The detection device 1 of the present embodiment, which includes the object communication input unit 2, the object data extraction unit 4, the partial sequence creation unit 5, and the detection unit 6, is installed on the microprocessor. The object data extraction unit 4 and the partial sequence creation unit 5 of the detection device 1 are the same as those described in process (1-2), and the principle of operation of the detection unit 6 of the detection device 1 is as described in <Detection unit 6> mentioned above. In addition, like the collection unit 11 of the vehicle for collection (FIG. 18), the detection device 1 can observe all the CAN messages, which flow through all the buses, of all the ECUs 14 and the times of arrival of these CAN messages and is configured so as to execute the object data extraction unit 4 and the like using them as input. A notification unit 21 has a function of notifying, by using radio communication, when the detection unit 6 detects an attack, a driver of the vehicle or a center that remotely monitors the operation of the vehicle that the detection unit 6 has detected an attack. To provide notification to the driver, methods such as providing notification on a display and providing notification by vibrating a handle so that the driver perceives the vibrations by the sense of touch can be adopted.

After the object data extraction rule and the partial sequence generation rule, which were used in process (1-2), are stored in the rule accumulation unit 15 of the vehicle for performing detection and the set of partial sequences generated in process (1-2) is stored in the model accumulation unit 16, the detection device 1 is turned on and the use (operation) of the vehicle for performing detection is started. Then, all the CAN messages flowing through the vehicle-mounted system are also sent to the detection device 1 via the gateway 13. The detection device 1 performs, on the CAN messages which arrive one after another, object data extraction in accordance with the object data extraction rule in the rule accumulation unit 15. When the number of CAN messages reaches the required number as a result of the object data extraction, the detection device 1 performs partial sequence creation in accordance with the partial sequence generation rule in the rule accumulation unit 15 and judges whether an obtained partial sequence is normal or an attack by using the set of normal partial sequences stored in the model accumulation unit 16. When the detection device 1 judges that the partial sequence is an attack, the detection device 1 provides an instruction to the notification unit 21 to notify the driver or the monitoring center in a remote location that an attack has been made and urge the driver or the monitoring center to deal with the attack by stopping the operation of the vehicle, stopping part of the functions, restricting the use of the functions, or the like.

<Effects>

The above configuration makes it possible to detect an inserted attack communication targeted at a periodic and event-related ID. Since it is possible to extract only periodic and event-related communication data in the object data extraction unit 4 and focus attention on this communication data, it is possible to reduce the number of occurrences of false detection without increasing the number of undetected attacks and improve the accuracy of detection.

<Modifications>

In the present embodiment, CAN is used in a communication network between ECUs; alternatively, other techniques may be used.

<Other Modifications>

The present invention is not limited to the above embodiment and modifications. For example, the above-described various kinds of processing may be executed, in addition to being executed in chronological order in accordance with the descriptions, in parallel or individually depending on the processing power of a device that executes the processing or when necessary. In addition, changes may be made as appropriate without departing from the spirit of the present invention.

<Program and Recording Medium>

Further, various types of processing functions in the devices described in the above embodiment and modifications may be implemented on a computer. In that case, the processing details of the functions to be contained in each device are written by a program. With this program executed on the computer, various types of processing functions in the above-described devices are implemented on the computer.

This program in which the processing details are written can be recorded in a computer-readable recording medium. The computer-readable recording medium may be any medium such as a magnetic recording device, an optical disk, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be distributed by storing the program in a storage device of a server computer and transferring the program from the server computer to other computers via a network.

A computer which executes such program first stores the program recorded in a portable recording medium or transferred from a server computer once in a storage thereof, for example. When the processing is performed, the computer reads out the program stored in the storage thereof and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that the program includes information which is provided for processing performed by electronic calculation equipment and which is equivalent to a program (such as data which is not a direct instruction to the computer but has a property specifying the processing performed by the computer).

Moreover, the devices are assumed to be configured with a predetermined program executed on a computer. However, at least part of these processing details may be realized in a hardware manner.

What is claimed is:

1. A detection device comprising:
processing circuitry configured to:
extract, on an assumption that a same serial number is assigned to a series of pieces of object communication data, from one or more pieces of object communication data which are transmitted from one or more electronic control units, at least part of a payload contained in object communication data that satisfies a predetermined condition, information by which a communication interval between the object communication data can be calculated, and a serial number of the object communication data as object data;
create, using the extracted object data, a partial sequence containing information corresponding to at least part of a payload and information indicating a communication interval from two or more pieces of object data with a same serial number; and
detect, using the created partial sequence and a detector, predetermined object communication data based on an order relation between at least part of a payload and a corresponding part of another payload and a communication interval, wherein
the predetermined condition is a condition for extracting only object communication data which is transmitted periodically and also in conjunction with a predetermined event,
the detector is created using partial sequences created based on known communication data, and
the known communication data is communication data that is known to be normal or to be an attack.

2. A detection device comprising:
processing circuitry configured to:
extract, on an assumption that a same serial number is assigned to a series of pieces of communication data, from one or more pieces of communication data which are transmitted from one or more electronic control units, at least part of a payload contained in communication data that satisfies a predetermined condition, information by which a communication interval between the communication data can be calculated, and a serial number of the communication data as object data;
create, using the extracted object data, a partial sequence containing information corresponding to at least part of a payload and information indicating a communication interval from two or more pieces of object data with a same serial number; and
detect, using the created partial sequence and a detector, predetermined communication data based on an order relation between at least part of a payload and a corresponding part of another payload and a communication interval, wherein
the predetermined condition is a condition for extracting only communication data which is transmitted periodically and also in conjunction with a predetermined event, wherein
the predetermined condition is that a number of types of values which at least part of a payload contained in communication data can take on is less than or equal to a threshold.

3. A detection device comprising:
processing circuitry configured to:
extract, on an assumption that a same serial number is assigned to a series of pieces of communication data, from one or more pieces of communication data which are transmitted from one or more electronic control units, at least part of a payload contained in communication data that satisfies a predetermined condition, information by which a communication interval between the communication data can be calculated, and a serial number of the communication data as object data;
create, using the extracted object data, a partial sequence containing information corresponding to at least part of a payload and information indicating a communication interval from two or more pieces of object data with a same serial number; and
detect, using the created partial sequence and a detector, predetermined communication data based on an order relation between at least part of a payload and a corresponding part of another payload and a communication interval, wherein
the predetermined condition is a condition for extracting only communication data which is transmitted periodically and also in conjunction with a predetermined event, wherein
the predetermined condition is that at least one of a type of data contained in communication data, a source of the communication data, and a destination of the communication data is a predetermined type of data, source, or destination or at least one of a type of data contained in communication data, a source of the communication data, and a destination of the communication data changes in a predetermined manner.

4. A detection device comprising:
processing circuitry configured to:
extract, on an assumption that a same serial number is assigned to a series of pieces of communication data, from one or more pieces of communication data which are transmitted from one or more electronic control units, at least part of a payload contained in communication data that satisfies a predetermined condition, information by which a communication interval between the communication data can be calculated, and a serial number of the communication data as object data;
create, using the extracted object data, a partial sequence containing information corresponding to at least part of a payload and information indicating a communication interval from two or more pieces of object data with a same serial number; and
detect, using the created partial sequence and a detector, predetermined communication data based on an order relation between at least part of a payload and a corresponding part of another payload and a communication interval, wherein
the predetermined condition is a condition for extracting only communication data which is transmitted periodically and also in conjunction with a predetermined event, wherein
the processing circuitry configured to detect predetermined communication data based on an amount of change in at least part of a payload between two or more payloads and a communication interval.

5. A detection device comprising:
processing circuitry configured to:
extract, on an assumption that a same serial number is assigned to a series of pieces of communication data, from one or more pieces of communication data which are transmitted from one or more electronic control units, at least part of a payload contained in communication data that satisfies a predetermined condition, information by which a communication interval between the communication data can be calculated, and a serial number of the communication data as object data;
create, using the extracted object data, a partial sequence containing information corresponding to at least part of a payload and information indicating a communication interval from two or more pieces of object data with a same serial number; and
detect, using the created partial sequence and a detector, predetermined communication data based on an order relation between at least part of a payload and a corresponding part of another payload and a communication interval, wherein
the predetermined condition is a condition for extracting only communication data which is transmitted periodically and also in conjunction with a predetermined event, wherein
the processing circuitry configured to classify values which at least part of a payload can take on into a plurality of sets and detect predetermined communication data based on an order relation between a set to which at least part of a payload belongs and a set to which a corresponding part of another payload belongs and a communication interval.

6. A detection method, implemented by a detection device that includes processing circuitry, comprising:
an object data extraction step in which the processing circuitry extracts, on an assumption that a same serial number is assigned to a series of pieces of object communication data, from one or more pieces of object communication data which are transmitted from one or more electronic control units, at least part of a payload contained in object communication data that satisfies a predetermined condition, information by which a communication interval between the object communication data can be calculated, and a serial number of the object communication data as object data;
a partial sequence creation step in which the processing circuitry creates, using the extracted object data, a partial sequence containing information corresponding to at least part of a payload and information indicating a communication interval from two or more pieces of object data with a same serial number; and
a detection step in which the processing circuitry detects, using the created partial sequence and a detector, predetermined object communication data based on an order relation between at least part of a payload and a corresponding part of another payload and a communication interval, wherein
the predetermined condition is a condition for extracting only object communication data which is transmitted periodically and also in conjunction with a predetermined event,
the detector is created using partial sequences created based on known communication data, and
the known communication data is communication data that is known to be normal or to be an attack.

7. A non-transitory computer-readable recording medium having recorded thereon a program for making a computer function as the detection device according to any one of claims 1 to 5.

* * * * *